United States Patent
Goldstein

(12) 
(10) Patent No.: US 6,251,344 B1
(45) Date of Patent: *Jun. 26, 2001

(54) AIR QUALITY CHAMBER: RELATIVE HUMIDITY AND CONTAMINATION CONTROLLED SYSTEMS

(75) Inventor: Mark K. Goldstein, Del Mar, CA (US)

(73) Assignee: Quantum Group, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,544

(22) Filed: Jun. 26, 1998

Related U.S. Application Data

(60) Provisional application No. 60/051,038, filed on Jun. 27, 1997.

(51) Int. Cl.[7] ........................................................ A62B 7/08
(52) U.S. Cl. .................... 422/123; 95/45; 95/52; 96/111; 96/181; 422/3; 422/4; 422/40; 422/105; 422/124
(58) Field of Search ............................... 422/40, 55, 105, 422/119, 4, 3, 123, 124; 220/1.5, 1.6, 913; 206/205, 213.1, 701; 96/109, 111, 118, 181; 95/44, 45, 52

(56) References Cited

U.S. PATENT DOCUMENTS

| | | | |
|---|---|---|---|
| 2,452,957 | * 11/1948 | Sabin ..................................... | 206/205 |
| 3,754,803 | * 8/1973 | Underwood et al. ................... | 312/31 |
| 3,801,011 | * 4/1974 | Guehler et al. ........................ | 206/205 |
| 4,043,934 | 8/1977 | Shuler et al. ........................... | 252/186 |
| 4,435,025 | * 3/1984 | Weintraub .............................. | 422/40 |
| 4,674,630 | * 6/1987 | Kirck ..................................... | 206/205 |
| 4,997,082 | * 3/1991 | Durocher ............................... | 206/205 |
| 5,063,164 | 11/1991 | Goldstein ............................... | 436/169 |
| 5,457,963 | * 10/1995 | Cahill-O'Brien et al. .............. | 422/40 |
| 5,618,493 | 4/1997 | Goldstein et al. ...................... | 422/57 |
| 5,618,496 | 4/1997 | Hasumi et al. ......................... | 422/90 |
| 5,624,848 | 4/1997 | Marnie et al. .......................... | 436/164 |
| 5,938,012 | * 8/1999 | Yeager et al. .......................... | 206/205 |

* cited by examiner

Primary Examiner—Krisanne Thornton
(74) Attorney, Agent, or Firm—Christie, Parker & Hale, LLP

(57) ABSTRACT

The present invention provides a means and a device to control relative humidity and airborne contaminants within a defined environment. The devices and methods of the present invention enable a user to regulate the relative humidity of a defined environment and insure that extreme conditions, e.g. less than 15% or greater than 90% relative humidity, do not exist. The air quality control system can also be used to control the relative humidity in and about a narrow range. Control over relative humidity and airborne contaminants is achieved by combining an appropriate salt and water solution, such as a saturated salt solution with a solid phase of that salt, with an isolation membrane and a getter system. The present invention is particularly useful for housing sensors, such as SIR sensors, which are sensitive to relative humidity extremes. The incorporation of a relative humidity control system with a SIR sensor results in greater stability, longer life, an increased response at relative humidity extremes, and a more uniform response over the entire range of relative humidity and temperature. Unlike conventional methods and devices, the present invention uses no power, can be open to the atmosphere, is orientation independent, and is inexpensive.

21 Claims, 6 Drawing Sheets

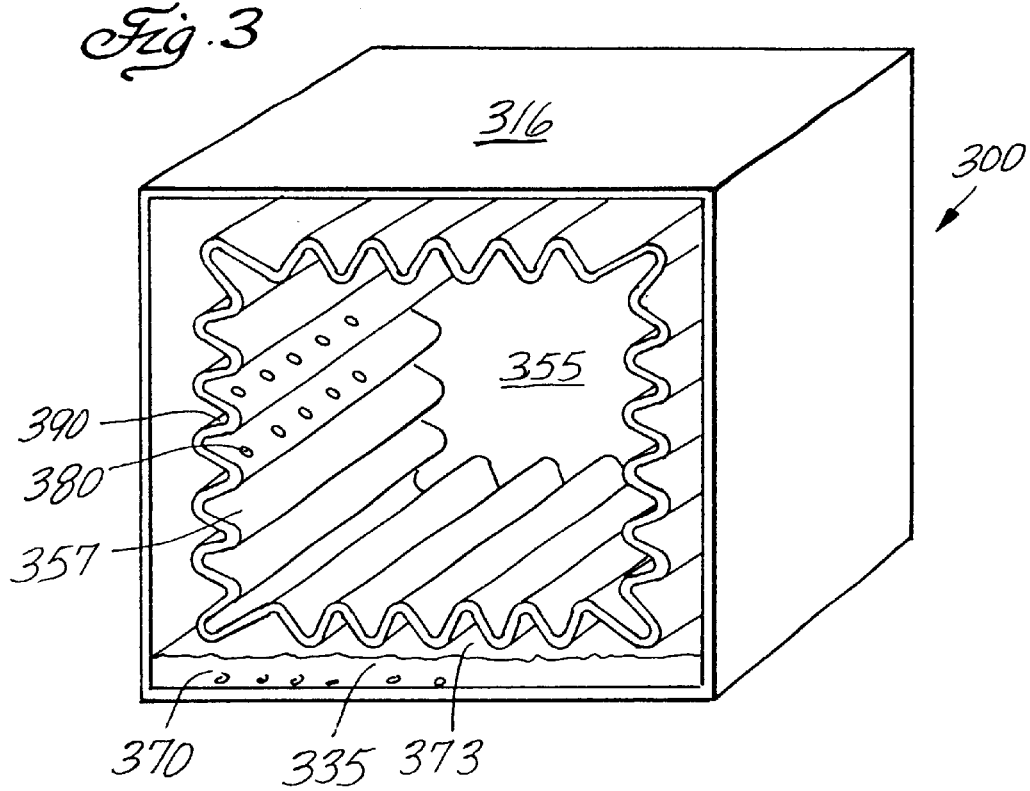
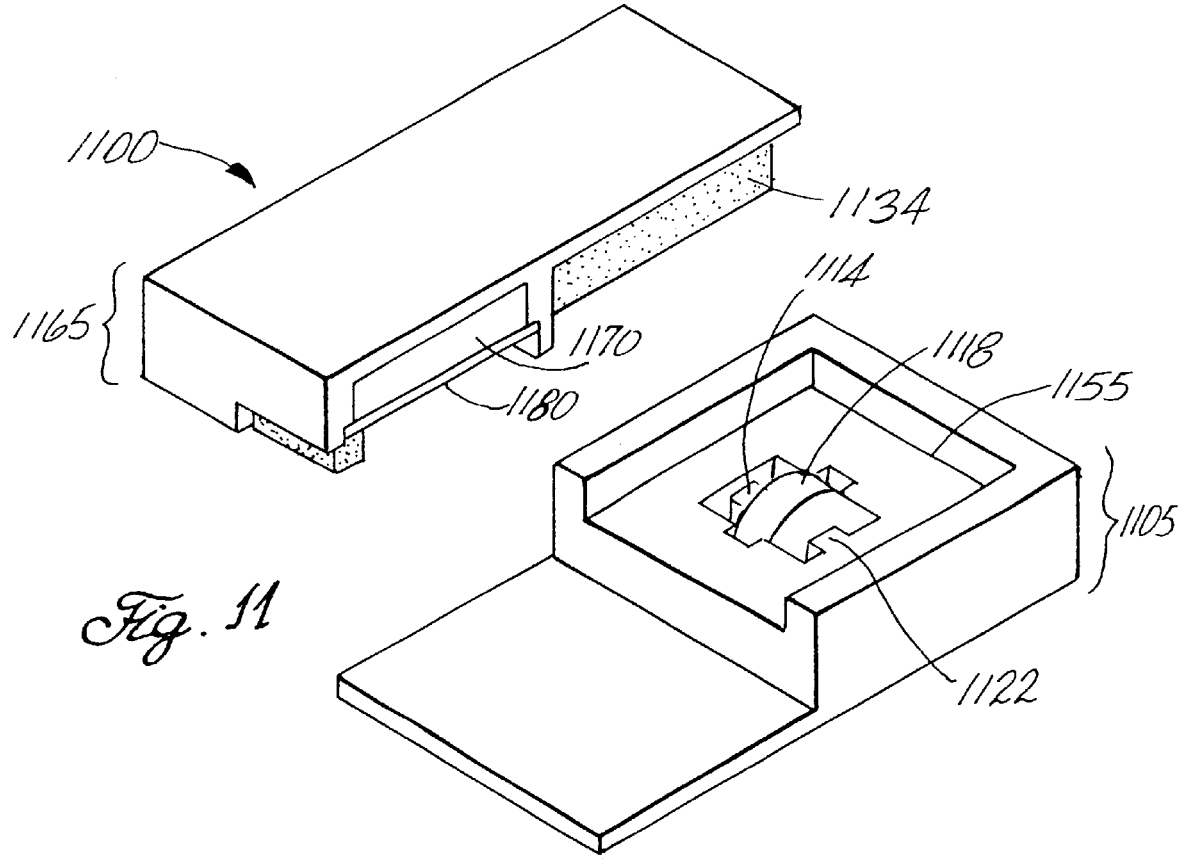

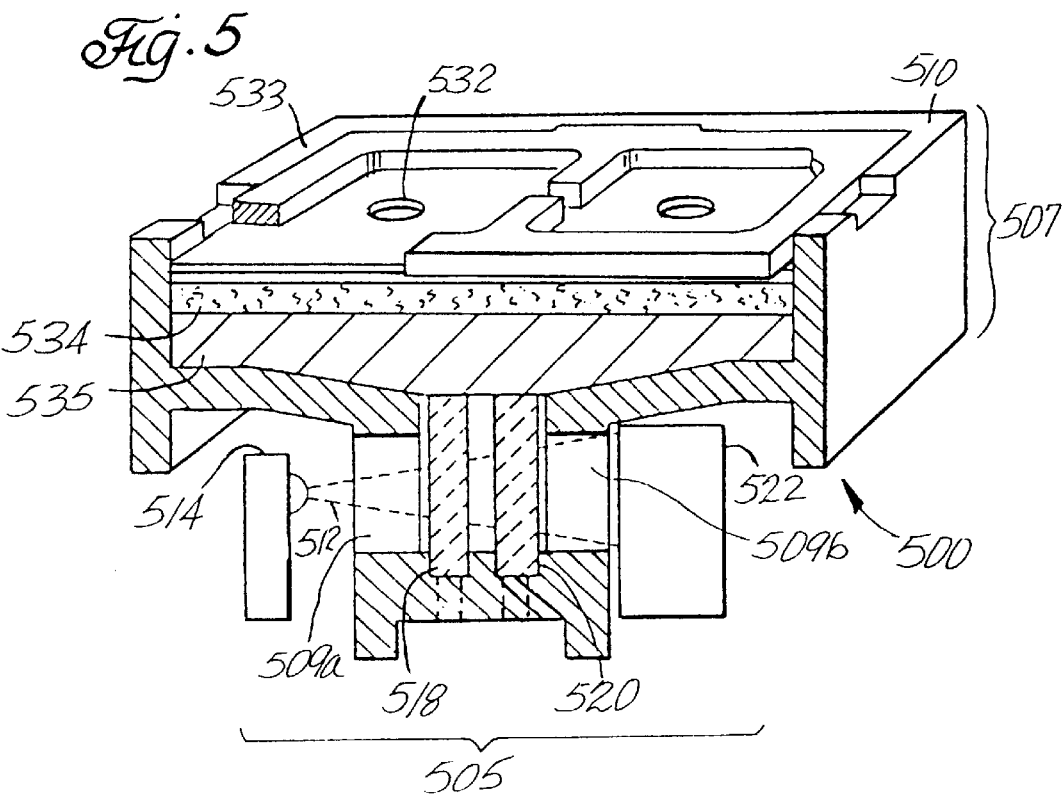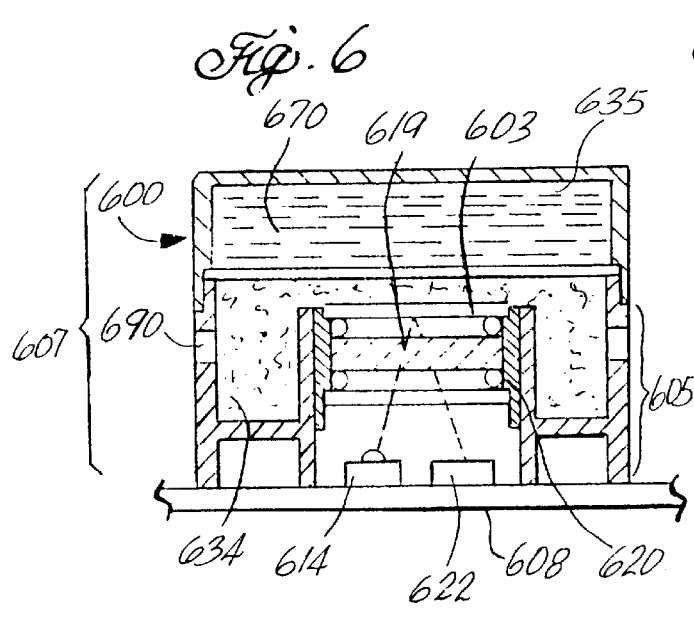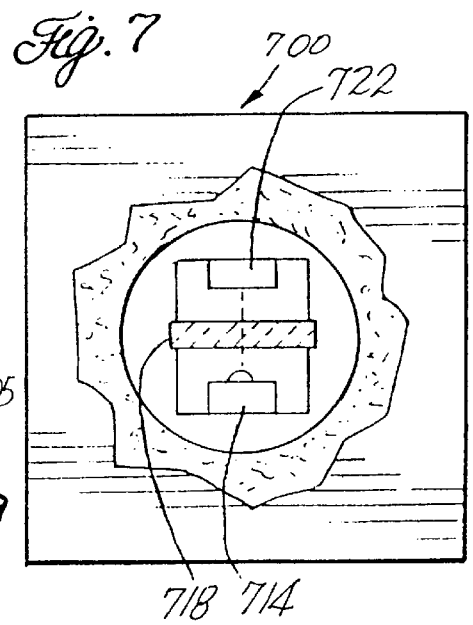

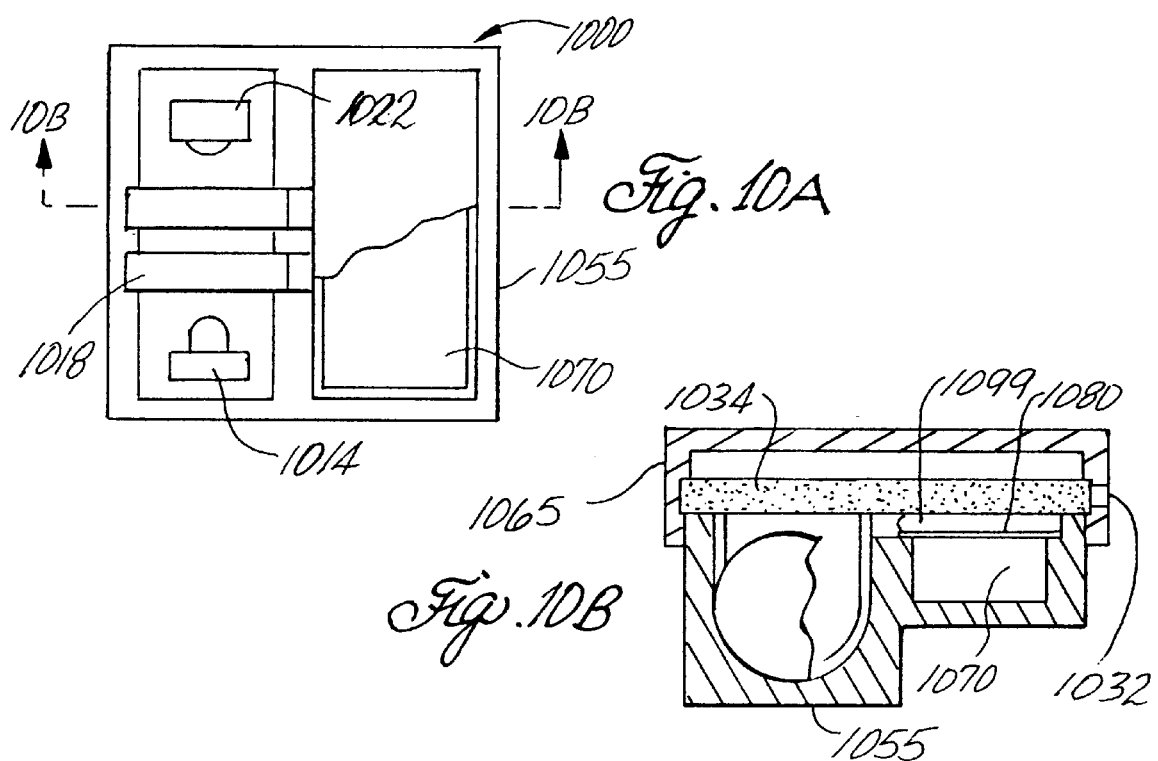

AIR QUALITY CHAMBER: RELATIVE HUMIDITY AND CONTAMINATION CONTROLLED SYSTEMS

CROSS REFERENCE TO RELATED APPLICATIONS

This application claims the benefit of U.S. Provisional Application No. 60/051,038 filed on Jun. 27, 1997.

FIELD OF THE INVENTION

The present invention is directed toward methods and devices for regulating certain air quality characteristics of a defined environment over a specified period of time and applications thereof. The air quality characteristics being regulated include relative humidity (RH) and the presence of undesired air borne contaminants. The air quality regulation device is orientation independent and does not require electrical power to operate.

BACKGROUND OF THE INVENTION

Numerous applications require controlling a defined environment's air quality characteristics, specifically providing an environment having a narrow range of relative humidity or preventing the creation of extreme relative humidity conditions, i.e. less than 10% or greater than 90% RH. As an example, when shipping environment-sensitive cargo such as optical devices, electronics, drugs, organisms, human organic material, seeds, electronics, mechanical devices, catalysts, chemicals, plants, art, or military devices, the shipping container which houses the cargo must maintain a range of relative humidity that best suits the type of cargo being shipped. Environment-sensitive cargo often require an environment having a defined range of relative humidity, i.e. greater than 50% or between −10% and 10%, to insure that the cargo will be preserved and maintained.

For example, the performance of carbon monoxide (CO) sensing systems is improved with the inclusion of a relative humidity control system. While carbon monoxide has no smell, visible appearance, or taste, it is very toxic. Because of energy conservation measures such as increased insulation and weather stripping, many buildings are tightly sealed, further leading to an increased likelihood of carbon monoxide poisoning.

Carbon monoxide detectors are examples of sensors that are designed to detect toxin levels accurately without costing over $100. Carbon monoxide sensors are often battery operated and made of a supramolecular chemical sensor/reagent coated onto a semi-transparent substrate. The reagent/substrate combination forms a solid state sensor system that responds to increasing exposure of carbon monoxide (CO) by means of a photochromic response, i.e., a change in electromagnetic radiation (e.g. light) reflected from the surface or a change in electromagnetic radiation intensity transmitted through the sensing element(s). Examples of such sensors are described in U.S. Pat. Nos. 5,063,164, 5,618,496, and 5,618,493. Additionally, reagents which can be used to detect CO are described in U.S. Pat. No. 4,043,934.

The materials used in CO detection are very sensitive to the extremes of relative humidity. For example, palladium and molybdenum salts, useful for carbon monoxide detection as described in Analytical Chemistry, Vol. 19, No. 2, pages 77–81 {1974), are only practical for use over short period of time because their accuracy is greatly affected by relative humidity.

While this salt technology was improved upon by adding a third metallic salt component which produces a self-regenerating catalyst, this method is short-lived. This catalyst, disclosed in U.S. Pat. No. 4,043,934, uses the impregnation of a carbon monoxide-sensitive chemical catalyst solution into powdered silica-gel substrates to give detectors sensitivity to low concentrations of atmospheric carbon monoxide. While this system is effective in detecting carbon monoxide, it has not met with commercial acceptance due to the short functional life of the catalyst and its inability to operate effectively at very low or high relative humidity, i.e. 5% or 95% RH, as compared to the more moderate range of relative humidity, i.e. 15% to 90% RH. Tests have shown that, at 100 parts per million (ppm), the reagents described in U.S. Pat. No. 4,043,934 do not properly function at less than 15% relative humidity or at above 90% relative humidity, if the material is in that environment for a long period of time, e.g., 168 hours or more.

Also, tests have shown that the carbon monoxide sensors described in U.S. Pat. No. 5,063,164 have adequate life but not enough sensitivity to satisfy the Underwriter Laboratory (UL) requirements listed in UL 2034, effective Oct. 1, 1998. The UL 2034 standards require continued sensor sensitivity after 168 hours of exposure to an environment having 15% relative humidity at 22° C. and to an environment having 95% relative humidity at 52° C. In other words, the sensing system should have sufficient sensitivity to detect 70 ppm of CO in an environment having 95% (±4%) RH at 52° C. for a period lasting between 1 hours and 4 hours, after having been first conditioned for 168 hours in an environment having 10% RH at room temperature.

The sensitivity of conventional CO sensors to relative humidity is of concern because, for a CO sensor system to be commercially useful, it must have a functional life of at least one year, preferably 5 to 10 years, and must operate over the full range of relative humidity found in the environment, i.e., 0 to 100% RH. These same concerns exist for the full range of biomimetic sensors described in U.S. Pat. Nos. 5,063,164, and 5,618,493 and for certain catalysts which operate effectively only within specific relative humidity and temperature ranges. For example, hopcolite works only under very dry condition and a Cu/Pd/Mo catalyst works well between 20 to 80% relative humidity.

Controlling the air quality, such as the relative humidity, of defined environments is especially critical to the proper functioning of military equipment. If the operative environments of military equipment have a high relative humidity, they will experience condensation on all cold surfaces whenever the equipment is carried up to a high altitude and returned rapidly to a low altitude. The operation of environment-sensitive equipment, such as computers, sensors, or weapon systems, can be easily compromised by this moisture, i.e. condensation, which has entered into the operative environments of the environment-sensitive equipment.

Additionally, corrosive or toxic warfare agents can impair the operation of military equipment or destroy the accuracy of these systems. For example, optical surfaces for infrared or other applications are particularly sensitive to corrosion and, therefore, susceptible to blurring or fogging. Furthermore, whenever combustion products or other battlefield material are emitted, they can cause a rapid corrosion of the military equipment. Therefore, air quality regulation of the storage and operative environments of military equipment is important to extend the life, effectiveness, and continued operation of the equipment.

Methods and devices for controlling relative humidity in a completely closed system have been known for many years. For closed systems that have limited movement and limited orientation, a typical ASTM procedure uses solid phase saturated salts to maintain specified relative humidity at a specified temperature. For example, magnesium nitrate can be used to maintain a relative humidity of 55% (±5%) within a temperature range of 20 to 30° C.; magnesium chloride can be used to maintain a relative humidity of 33% (±3%) within a temperature range of 10 to 60° C.; and sodium nitrite can be used to maintain a relative humidity of 66% (±3%) within a temperature range of 20 to 30° C. The CRC Handbook of Chemistry and Physics, 69th Edition, page E42 discloses tables of salts which will control the relative humidity in a closed system in a range of about 9% to 99% RH. Additionally, Stokes and Robinson, Ind. Eng. Chem. 41: 2013 (1949), discloses the use of various concentrations of sulfuric acid, sodium hydroxide, and calcium chloride to maintain a substantially constant relative humidity at 25° C. Finally, to protect a device from high relative humidity, a dessiccant such as silica gel, calcium carbonate or similar water absorbing material, can be added before shipping.

These current methods of regulating relative humidity have, however, substantial disadvantages. Conventional methods and devices are successful at regulating the relative humidity of a defined environment when the surrounding real world environment has a relative humidity in the range of about 15 to 89% RH. In the real world, however, real world environments reach the relative humidity extremes of 100% RH and near zero RH, i.e. 4% RH. Therefore, there is a need for an improved device and method that can regulate relative humidity in a desired range despite the extreme relative humidity conditions of the surrounding environment.

Additionally, in some air shipping applications, it is desirable to have packaging containers that can release pressure upon reaching high altitudes, therefore requiring the package to have an opening to atmosphere. To control the relative humidity within such a pressure-release container, reservoir systems having a high surface to volume ratio and containing one or more salts, either as a solid or partially solid in solution, and water is desired. However, these relative humidity control systems are either completely closed, and therefore not suitable to a pressure-release container, or limited in their orientation relative to a chosen reference point, i.e. ground level.

Similarly, while an ASTM procedure on how to best control relative humidity in a closed system does exist, a method and/or device is needed to extend that relative humidity control to open systems which interact with the atmosphere, i.e. sensor systems that detect a gas in the air within a predetermined time at a predetermined concentration.

Finally, the use of dessicant material is also accompanied by significant limitations. Under prolonged exposure to high relative humidity, dessicant materials become saturated, become unable to absorb moisture, and, therefore, fail to prevent high relative humidity from damaging the environment-sensitive cargo. Although the labor to replace these desiccant materials is expensive, failure to do will result in damage to the environment-sensitive cargo.

In sum, while the control of air borne contaminants and relative humidity is critical to the preservation of innumerable types of materials and devices, there currently does not exist an air quality control system that is orientation independent, small, rugged, inexpensive, power independent, able to handle extremes in relative humidity, able to withstand long periods of dormancy without maintenance, and capable of lasting for extended periods of time.

SUMMARY OF THE INVENTION

The present invention provides a means and a device to control relative humidity and airborne contaminants within a defined environment. Unlike conventional methods and devices, the present invention uses no power, is open to the atmosphere, is orientation independent, and is inexpensive.

The devices and methods of the present invention enable a user to regulate the relative humidity of a defined environment and insure that extreme conditions, e.g. less than 15% or greater than 90% RH, do not exist. The air quality control system can also be used to control the relative humidity in and about a narrow range, e.g., 20% to 30% RH, greater than 50% RH, or 10% to −10% RH.

Control over relative humidity and airborne contaminants is achieved by combining an appropriate salt and water solution, such as a saturated salt solution with a solid phase of that salt, with an isolation membrane and a getter system. The saturated salt solution is provided in a chamber that is in gaseous communication with the regulated environment through a hydrophobic isolation membrane that passes gaseous, not liquid or solid, molecules and assists in the regulation of relative humidity in the controlled chamber. An appropriately selected getter system insures that undesirable air borne contaminants also do not enter the chamber.

The present invention is particularly useful for housing sensors, such as Solid State Infrared Reservoir (SIR) sensors, which are sensitive to relative humidity extremes. The incorporation of a relative humidity control system with a SIR sensor results in greater stability, longer life, an increased response at relative humidity extremes, and a more uniform response over the entire range of relative humidity and temperature, as specified by UL 2034 test, effective Oct. 1, 1998.

In addition, the restricted flow through the getter results in the increased functional life of the getter upon exposure to ammonia and thus improves the lifespan of the CO sensor. When the sensor system is exposed to ammonia and other basic interference gases, the restricted flow limits the amount and rate of interference, thus improving the efficiency of the getter and increasing the useful life of the sensor.

BRIEF DESCRIPTION OF THE DRAWINGS

FIG. 3 is a perspective of a rectangular relative humidity control system having a high internal surface area.

FIG. 5 is a perspective of the sensor housing assembly for the SIR system.

FIG. 6 is a persepective of a rectangular SIR sensor assembly system.

FIG. 7 is a persepective of a rectangular SIR sensor assembly system.

FIG. 10$a$ is a perspective of a miniature SIR CO detector system.

FIG. 10b is a cut-away perspective of a miniature SIR CO detector system.

FIG. 10c is a perspective of a miniature SIR CO detector system.

FIG. 11 is a perspective of a miniature SIR CO detector system.

DETAILED DESCRIPTION

The present invention is directed to methods and devices for controlling the relative humidity of an environment and preventing contamination of an environment by unwanted airborne agents, i.e. a chamber, that can be optionally open to the atmosphere. The invention uses a mixture of salts in a specially designed chamber to regulate the relative humidity of the chamber environment and an isolation membrane to control the movement of liquids and gases within the chamber and to render the system orientation independent. Optionally, a contaminant absorbing material can be placed within or around the hydrophobic membrane or within or around any openings to the external environment to absorb unwanted contaminants and prevent the infiltration of such contaminants into the chamber environment. The present invention is particularly suited to the regulation of sensor environments to insure the continued reliable operation of sensing devices, such as carbon monoxide sensors.

The relative humidity control means of the present invention comprises a salt and water combination, such as a saturated salt solution having a solid salt phase, a specially designed chamber, and an isolation membrane. Together with the temperature and relative humidity of the external environment, the type of salt/water solution used, the surface area of the contact region between the solution and the chamber air, and the length of the pathway from the atmosphere to the chamber all effect and primarily determine the relative humidity of the chamber.

Figure 1:
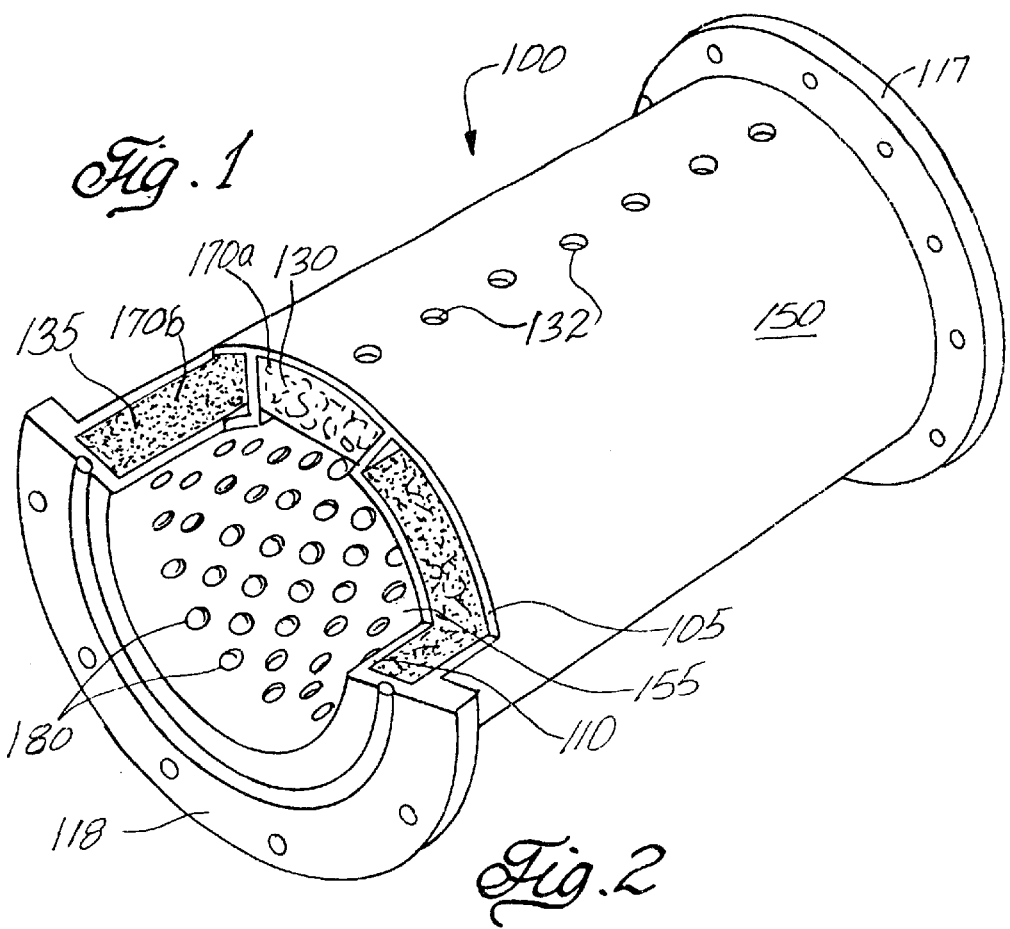
FIG. 1 is a perspective of a cylindrical relative humidity control system.

Referring to the drawings, FIG. 1 depicts a cylindrical environmental control system 100. A cylindrical system 100 can be inexpensive to build and can provide a useable interior chamber volume 155 that is between 40% to 99% of total system volume. Because the ability to control relative humidity is a function of saturated salt surface area to total chamber volume, a spherical system would provide even greater humidity control since it would enable a greater salt/water surface to internal volume ratio. However, spherical systems are often too expensive to construct relative to cylindrical systems.

A cylindrical chamber housing 150 has a cylindrical exterior wall 105 and a cylindrical interior wall 110 which together define a cylindrical casing space 170a, 170b. The cylindrical interior wall 110 defines a cylindrical chamber interior 155 within which cargo, specimens, or any other object requiring controlled relative humidity may be located. The casing space is further defined by physical separation into two separate chamber regions, the first region being a smaller casing space 170a and the second region being a larger reservoir 170b. The interior wall 110 is permeated by a plurality of openings 180 which provide a conduit between the cylindrical casing space 170a, 170b and the interior chamber 155.

A plurality of openings 132 also permeate the region of the exterior wall 105 that is in contact with the smaller casing space 170a. The exterior wall openings 132 combined with the interior wall openings 180 provide a conduit between the external environment, i.e. atmosphere, and the interior of the chamber 155 and enable pressure equalization during rapid pressure changes. While round openings 132, 180 are depicted here, the conduits can be created by any type of opening, including slits.

A getter system 130 may be placed within the smaller casing space 170a. The getter system 130 prevents the entry of specific gases or airborne contaminates such as biological, chemical or radioactive agents. A getter 130 protects the housed item, i.e. a weapon or weapon system, from contamination, thereby extending the life and operating performance parameters of the housed item. Most metals such as steel are affected by acid vapor corrosion as well as moisture. Therefore, there is a need for a getter in an environmental control system.

Getters can be placed throughout the chamber interior 155 and should be used if a risk of contamination from an airborne particle exists. It is preferable to identify the most likely contaminants to the item being housed in the interior chamber 155 and to obtain a getter that best removes or reacts with that specific contaminant.

For example, the life of many types of sensors is shortened by exposure to basic gases such as methyl amine, ethyl amine or ammonia. Getters such as tartaric acid, citric acid, molybdenum trioxide, phosphoric acid and other carboxylic acids or acid polymers, can be used to prevent ammonia or similar basic gases from adversely effecting sensitive equipment, such as SIR sensors, for a defined lifespan. Acid vapors of HCl, nitrous and nitric acid, and sulfur oxides can be easily removed by an acid getter which may comprise a nonvolatile stable base, such a bicarbonate or a carbonate. A getter can remove both acid and bases by building a multilayer system through which infiltrating gas must flow.

A salt/water solution 135 is located within the reservoir 170b. One skilled in the art would know how to choose a salt solution to regulate a chamber within a desired range of relative humidity. For example, to achieve a relative humidity in the range of 85 to 95%, one could use potassium sulfate; for low RH in the range of 5 to 15% RH, one could use sodium hydroxide; for relative humidity in the range of about 50% RH, one could use magnesium nitrate. Other salt water systems include magnesium chloride, sodium iodide, sodium chromate, potassium carbonate, sodium chloride, sodium nitrate, sodium nitrite, sodium bromide, and mixtures thereof.

Provided below is a table of aqueous salts which can be used to control relative humidity. The expected performance from these salt systems has been estimated based upon their ability to modify the aqueous surface tension of water. The nomenclature used is as follows:

+ indicates the listed salts provide an environment that enables sensor systems, such as CO sensors, to pass UL tests, such as UL 2034;

++ indicates that the listed salts are preferred embodiments for use in housing sensor systems, such as CO sensors, which need to pass UL tests, such as UL 2034;

− indicates that the listed salts failed to enable sensor systems, such as CO sensors, to pass UL tests, such as UL 2034; and

* indicates that the listed salts have long term stability problems.

TABLE 2

Reservoir Aqueous Salts Used to Control RH

| Name of Salt (2 grams) | 11% RH | 95% RH |
| --- | --- | --- |
| NaI* | + | + |
| $Mg(NO_3)_2$ | + | + |
| $MgSO_4$ | + | − |
| $MgCl_2$ | − | + |
| KCl | + | − |
| 1:1 mix NaI and KCl | ++ | ++ |
| 1:1 mix $Mg(NO_3)_2$ and $MgSO_4$ | ++ | ++ |
| 0.5:1.5 mix $Mg(NO_3)_2$ and $MgSO_4$ | ++ | ++ |
| 1.5:0.5 mix $Mg(NO_3)_2$ and $MgSO_4$ | + | + |
| 1:1 mix $Mg(NO_3)_2$ and $MgCl_2$ | + | + |
| 1:1 mix $MgSO_4$ and $MgCl_2$ | ++ | ++ |
| NaCl | + | − |
| $CaCl_2$ | + | + |
| LiCl | − | + |
| 1:1 mix NaCl and $CaCl_2$ | + | + |
| 1:1 mix NaCl and LiCl | + | + |
| 1:1 mix $CaCl_2$ and LiCl | + | + |

It was observed in these tests that certain mixed salts were superior to single salts in maintaining relative humidity within semi-open systems, such as the carbon monoxide sensor systems which are described in more detail below.

Many other combinations of these and other salts may also be used to control relative humidity. Additionally, other methods exist for controlling the relative humidity of an environment. The aforementioned salts may be used in water glycerin systems or glycerin systems by themselves. Other chemicals can also be used depending on the way the chemicals affect the aqueous surface tension, absorb water, release water, and achieve the desired range of relative humidity.

A porous hydrophobic membrane [not shown] is provided within the reservoir space 170b and placed between the salt/water solution 135 and the interior wall 110 which is permeated by openings 180. The hydrophobic membrane [not shown] prevents the salt/water solution 135 from moving out of the reservoir space 170b and into the chamber interior 155, thereby creating an orientation independent system. Suitable materials for the membrane [not shown] include Goretex or 1073 B Tyvek.

The relative humidity control system is partly effectuated by the use of a hydrophobic membrane [not shown] to control the relative rates of diffusion of water vapor into and out of the interior chamber 155. To control relative humidity at a desired level, water vapor should diffuse into the interior chamber 155 from the reservoir 170b at a greater rate than out of the interior chamber 155 to atmosphere through the exterior wall openings 132. There will be a gradient of relative humidity within the chamber which will depend on the relative humidity and temperature exterior to the chamber, the amount of surface area of the saturated salt, the size and shape of the chamber, the porosity of the membrane and the existence of other restrictions to diffusion, such as the inclusion of getters, filters or other mechanical components. A preferred method of establishing the desired differential in diffusion is to provide a hydrophobic membrane with a surface area that is larger than the openings exposing the control chamber to the atmosphere.

To create a controlled environment, the environmental control system 100 may be closed on both ends 117 and 118 by attaching circular lids [not shown]. While still open to atmosphere, the system 100 is providing a relative humidity controlled environment for items housed in the chamber interior 155 that is open to atmosphere, controls the infiltration of contaminants, is orientation independent, is inexpensive, and requires no power to operate.

While the system 100 has been described with two casing chambers, 170a, 170b, the invention is not limited to such a configuration. For example, where getters are not being used or are placed in the chamber interior 155, the casing space can comprise a single chamber, i.e. the reservoir chamber 170b. The exterior wall holes 132 may be placed anywhere within the exterior wall 105 and may be separated from the salt/water solution 135 by a second membrane system. The physical shape of the chamber can be of any geometry, including rectangular, spherical, or polygonal. In addition, a window [not shown] may be provided through which signals may be sent or received and the lids could be designed as hinged doors or flanges to provide easy removal.

Figure 2:
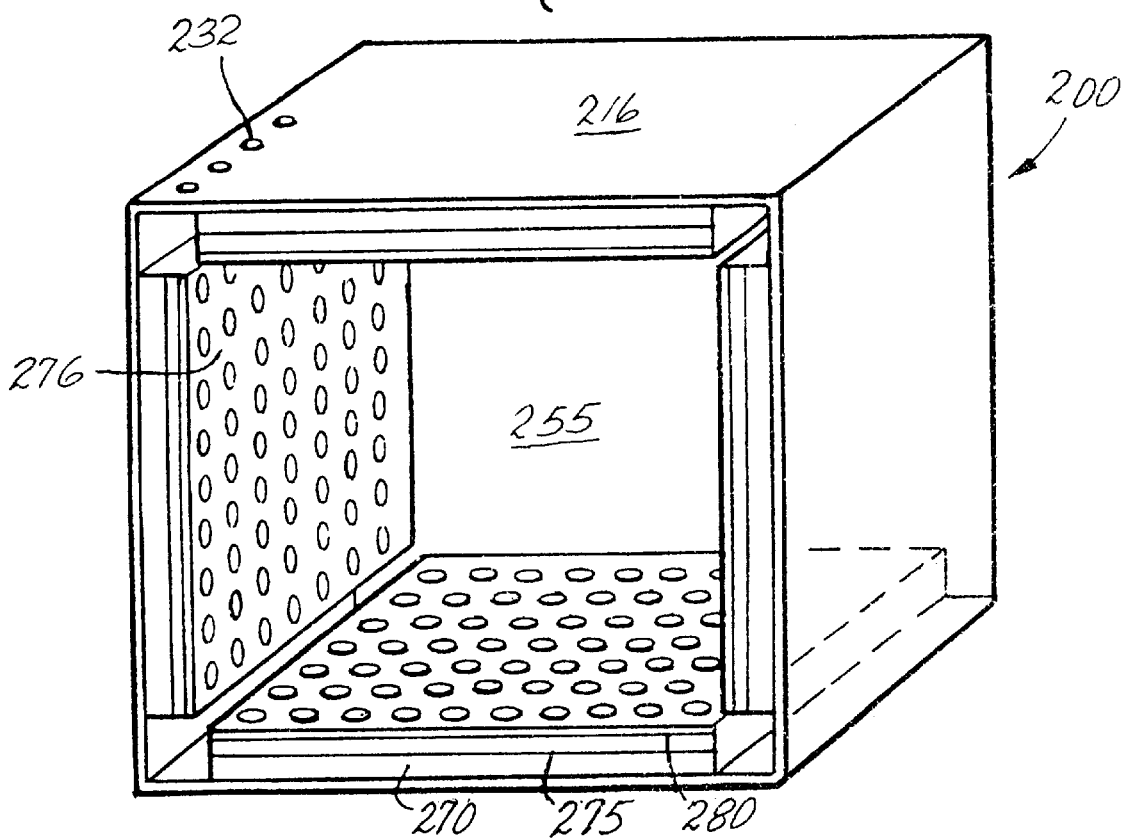
FIG. 2 is a perspective of a rectangular relative humidity control system.

A second embodiment of the present invention is shown in FIG. 2. A rectangular environment control system 200 is shown having a rectangular housing 216, a set of four salt/water reservoirs 270 located on the walls of the housing 216, wherein each reservoir comprises an enclosed rectangular volume 275 having a perforated sheet 276 covering the rectangular volume 275 and facing the chamber interior 255, a diffusion barrier material 280 placed between the salt/water solution in the reservoir and the perforated sheet 276, and openings to atmosphere 232. An appropriate salt/water solution [not shown] is located within each reservoir 270.

A getter system and door are not shown. To be most effective, however, a getter system should be employed to reduce penetration of certain undesirable contaminants. The control system 200 should also have a door which can be designed for quick physical access and which may have hatches or windows to allow emission of weapons materials, such as bullets or photons, or for communication with sensing equipment.

While not optimal from a surface area to volume ratio perspective, a rectangular relative humidity control system is often preferred because many shipping, storing, and handling functions are more efficiently performed with a rectangular unit. Additionally, many items, such as computers, fit better into a rectangular housing. To improve the surface area of the salt/water solution to chamber interior volume ratio, the reservoirs 270 should be made thin.

A third embodiment of the present invention is shown in FIG. 3. As with the second embodiment, this embodiment provides a rectangular environment control system 300 having a rectangular housing 316. Internally, however, this embodiment uses a high surface area reservoir system 370 to increase the salt/water solution 335 surface area to chamber interior 355 volume ratio. The reservoir system 370 is a continuous chamber defined by the interior walls of the housing 300 and an undulating surface 357 having perforations 380 which place the interior chamber 355 in gaseous communication with the salt/water solution 335. A diffusion barrier 390 is positioned between the undulating surface 357 and salt/water solution 335 to enable the regulated flow of water vapor between the reservoir system 370, interior chamber 355, and external environment.

Air space 373 can be included within the reservoir system 370 to provide room for expansion and other dimensional changes. An air entry system [not shown] should be included to provide a pressure release mechanism. A getter [not shown] should also be incorporated into the control system 300 and placed proximate to the air entry system [not shown] to remove undesirable contaminants.

The present invention may be used to house or transport any item. One example application is the use of a relative humidity control system to house a SIR carbon monoxide sensor system. The sensor system can comprise a high surface area thin film material coated onto a transparent porous glass or a high surface area thin film coated onto a reflective substrate. The sensor system responds very selectively to carbon monoxide, and has a slower response at very low RH and a faster response at high RH.

As shown in FIG. 5, the present invention can be used to house a sensor and provide the sensor with a controlled operative environment. The sensor 500 comprises sensor housing 510 that incorporates a sensor assembly 505 with a getter/shock absorber system 507.

The environment control system [not shown] comprises a reservoir system [not shown] having a salt/water solution separated from the sensor assembly 505 and the getter/shock system 507 by a perforated surface [not shown] and diffusion barrier, i.e. a hydrophobic membrane [not shown]. The preferred embodiment uses a supporting grid type structure to support the hydrophobic membrane. The distance between supports should be less than 0.5 mm. The hydrophobic membrane may be sealed to the supporting member and then the supporting member is ultrasonically sealed into the housing using any conventional means, such as energy directors.

A getter system 534 is employed to prevent the infiltration of harmful gases or particulate matter. A locking mechanism 533 is used to hold the getter system 534 in place. Openings 532 on the surface of the getter/shock system 507 provide a pathway for gases to enter through the getter 534 and into the sensor assembly 505. The getter system 534 insures that all gases entering the sensor assembly 505 are screened for certain harmful contaminants. A membrane [not shown] may be positioned between the getter system 534 and openings 532 to provide control over water vapor diffusion between the reservoir system [not shown] and the sensor assembly 505. The membrane [not shown] may be held in place by a locking clip. Openings may be provided at other locations in the sensor 500, provided that getter systems are placed proximate to the openings to regulate the inflow of contaminants. The sensor housing 510 is otherwise air tight.

A shock absorber 535 is located between the getter system 534 and sensor assembly 505. Through compression, the shock absorber 535 holds the sensors 518, 520 in place and prevents any significant movement of the sensors 518, 520.

As stated previously, getters such as tartaric acid, citric acid, molybdenum trioxide, phosphoric acid and other carboxylic acids or acid polymers, can be used to prevent ammonia or similar basic gases from adversely effecting SIR sensors. Shown below are getters having varying configurations for the removal of an average ammonia concentration of 25 parts per billion (ppb). The configurations include getters in the form of a square and getters in the form of a grid. The getter grid is the same shape as the getter square except there are 4 holes cut from the center. The grid and square have a thickness of about 0.04 to about 0.062 inches and dimensions of about 1.1 inches by 1.2 inches. The getter is located in a cavity and may extend slightly into the internal chamber that houses the sensor or other equipment. The varied configurations result in varying lifespans, ranging from 8 to 42 years depending on the configurations discussed below:

1. Slot Getter: 5% PVMA impregnated on polyester felt. Has an 8 to 12 year life.

2. Internal Getter: 5% PVMA on blank felt and positioned in a slot in the internal chamber. Has an 18 to 28 year life.

3. Double Getter: Combining an internal and grid getter, they both have 5% PVMA on polyester felt. Has a 30 to 40 year life.

4. Double Getter: Combining an internal and square getter, they both have 5% PVMA on polyester felt. Has a 42 year life.

The sensor assembly 505 comprises two sensors 518, 520 placed in between two windows 509a, 509b which are further placed in between a light emitting diode (LED) 514 and photodiode 522. The first sensor 518 responds better at high humidity while the second sensor 520 responds better at low humidity.

When operating, gas diffuses through openings [not shown], passes by a reservoir system having a salt/water solution [not shown], through the holes 532, through the membrane [not shown], through the getter 534 and shock absorber 535, and into the sensor assembly 505. Concurrently, the LED 514 is emitting photons to produce a beam 512 that passes through the first window 509a, the sensors 518, 520, and the second window 509b and is eventually collected by the photodiode 522. The sensors 518, 520 are optically coupled with the LED 514 and photodiode 522. The gas which filters into the sensing chamber has been screened for levels of humidity, particulate matter, and gases which could be harmful to the sensors. The level of carbon monoxide, the gas being monitored, has not been substantially varied or restricted.

The transmissivity of the sensors 518, 520 changes in response to varying levels of carbon monoxide present in the immediate atmosphere. By monitoring the change in photon transmission 512, the photodiode 522 is able to translate the change in sensor transmissivity into a quantification of the amount of carbon monoxide present in the entering gas. More specifically, as disclosed in U.S. Pat. No. 5,624,848, the light received by the photodiode 522 is translated into a photocurrent that is proportional to the transmitted light received by the photodiode 522. The photocurrent charges a capacitor [not shown] which is set to a threshold value and is programmed into a microprocessor [not shown]. The microprocessor records the charging time of the capacitor, thereby producing a plurality of sensor readings proportional to the darkness of the sensor. An alarm register [not shown] within the microprocessor records the differences between sensor readings and, when it exceeds a predetermined value, enters into an alarm state that signals the presence of an undesired level of carbon monoxide.

The preferred sensors for use in the present invention have an operating life of at least three years and possibly 10 years under real world conditions. Such sensors have been previously described in U.S. Pat. Nos. 5,063,164 and 5,618, 493 and U.S. patent application Ser. No. 08/612,301 filed Mar. 7, 1996, which is herein incorporated by reference. These sensors are sensitive to very high relative humidity and turn white or opaque in environments where high relative humidity causes the condensation of water within the sensors' small pores.

The preferred sensors comprise a substrate coated with a thin layer of supramolecular chemical complex. The supramolecular chemical complex may comprise bio-derived components, such as cyclodextrins, which may be produced from the action of certain bacteria on starch to form macrocyclic carbohydrate molecules consisting of six, seven, or eight glucose units arranged in a Torus shape. Different forms of such compounds, i.e. α, β, gamma, δ, ε, φ, etc., other cyclodextrins, and derivatives thereof are then formed into supramolecular arrays for either reflective or transmissive optical detection.

Figure 4:
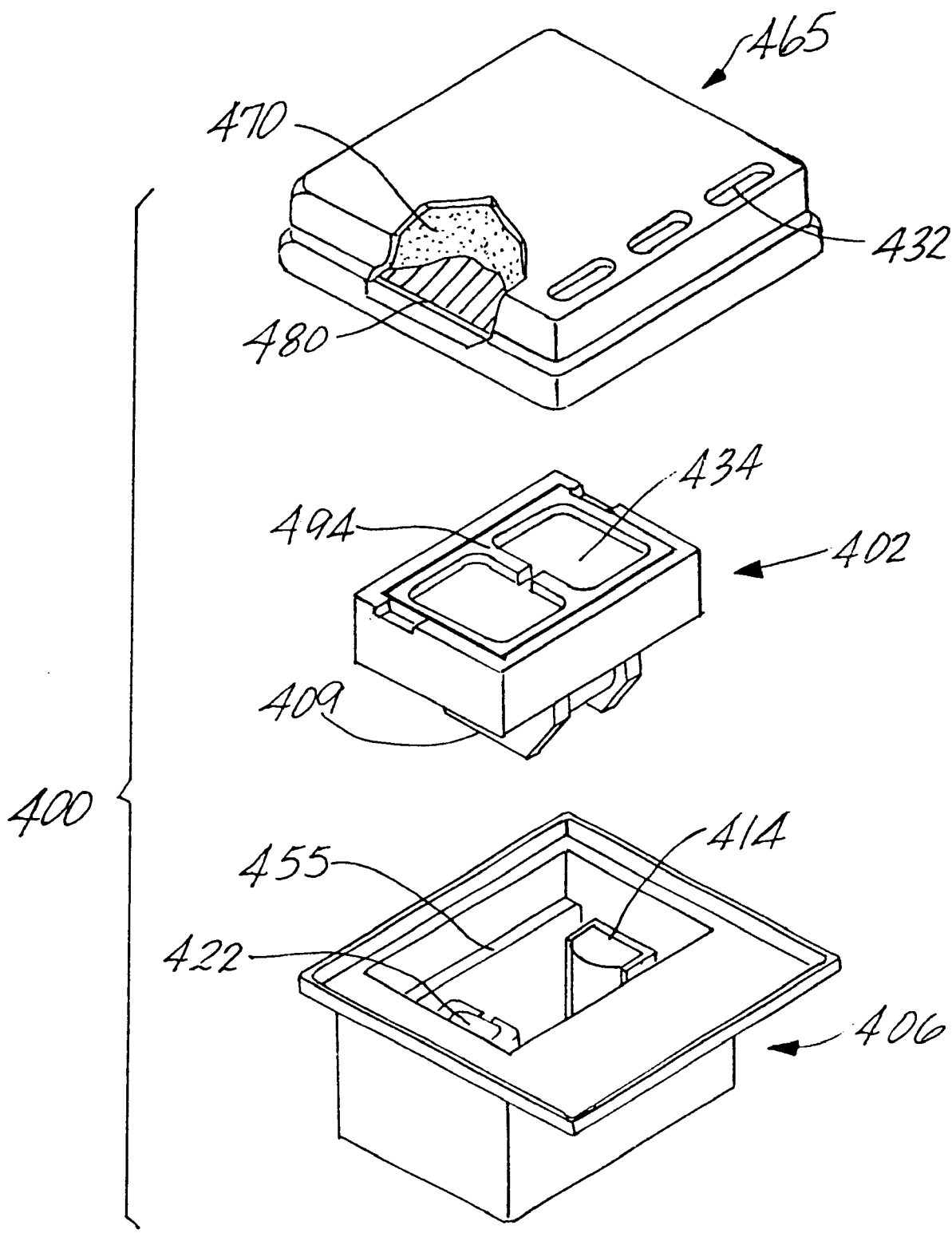
FIG. 4 is blown up perspective of the assembly of a SIR system.

FIG. 4 provides an exploded view of the assembly of a large SIR, also known as a "Big Top". The sensor 400 consists of three major subassemblies, i.e., the base 406, the sensor assembly 402 and the environment control system 465. The base contains the LED 414 and photodiode 422. The sensor assembly 402 comprises the sensing elements [not shown], clear windows 409 that pass photons through the sensing elements from the LED 414 and into the photodiode 422, and a portion of the environment control system, namely, the getter 434 which is held in place by a spring clip 494. The environment control system 465 comprises the reservoir system 470, an isolation membrane 480, and openings 432 through which air can enter the sensor.

A side view of a second embodiment of the SIR sensing system 600 is provided in FIG. 6. The SIR sensing system 600 comprises a sensor assembly 605 and an environmental control system 607 which are optionally attached to a PC board 608. The sensor assembly 605 comprises a surface mount LED 614 and photodiode(s) 622 which are optically coupled to sensor 619. The sensor 619, is held in place by a sensor stabilizing structure 620 that locks the sensor 619 in a fixed position without interfering with the transmission and reception of light. A mirror 603 reflects light emitted from the LED 614 and through the sensor 619 back toward the photodiodes 622.

The environmental control system 607 comprises a reservoir system 670 having a salt/water solution 635 and positioned on top of a getter system 634 and the sensor assembly 605, openings 690 to the external environment which permit gas to enter into sensor assembly 605 through the getter system 634, and a diffusion barrier [not shown] to regulate the movement of water vapor to and from the sensor assembly 605. The effect of restricting air flow on sensor response can be taken into account by modifying response time software, such as the software disclosed in U.S. Pat. No. 5,624,848 and/or application Ser. No. 60/026,534.

As opposed to the two sensor sensing methods disclosed in U.S. Pat. Nos. 5,618,496 and 5,618,493, the present invention enables the reliable use of only one sensing element, thereby reducing costs, providing for easier installation and testing, and improving sensor operation. When dual sensors are used with the present invention, an even more uniform response is achieved over the range of 0 to 100% relative humidity in a manner that is both inexpensive and satisfies the UL 2034 test which is effective Oct. 1, 1998. FIG. 7 depicts single sensor configuration comparable to that shown in FIG. 5.

Figure 8:
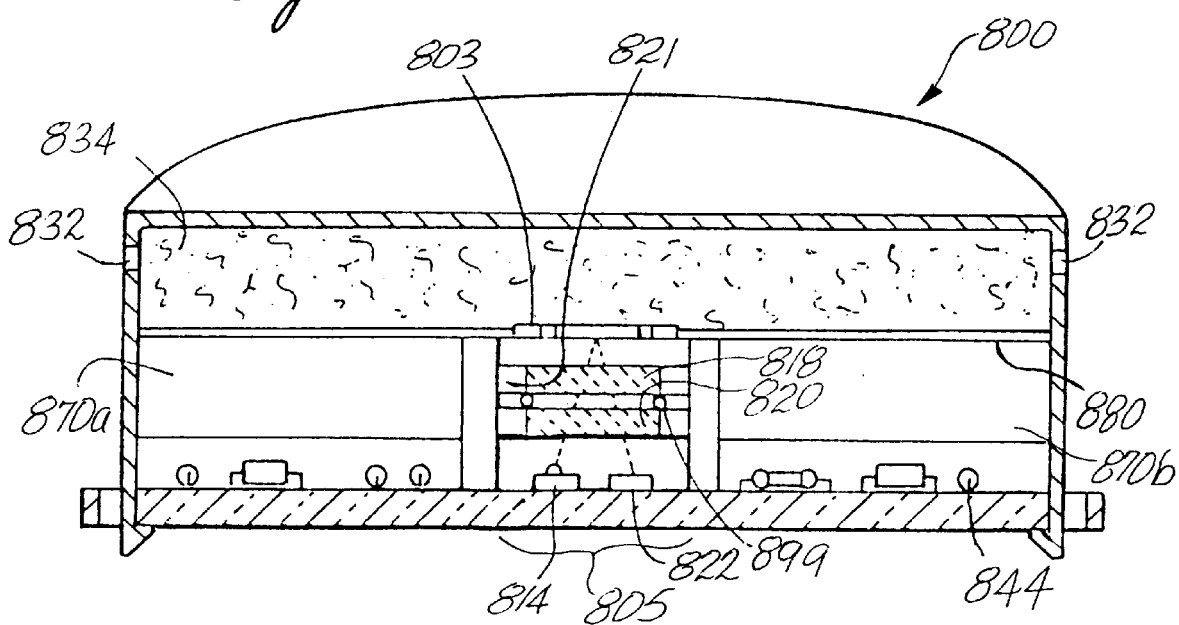
FIG. 8 is a persepective of a SIR sensing system.
Figure 9:
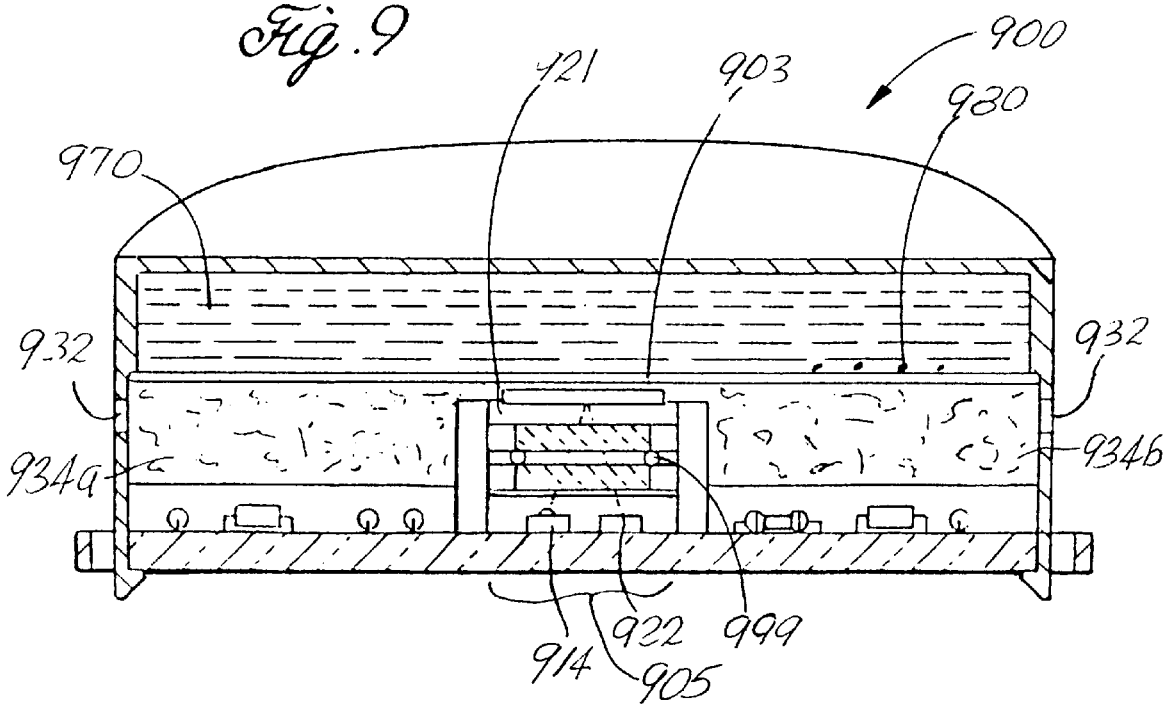
FIG. 9 is a persepective of a SIR sensing system.

A third embodiment of a SIR sensing system in an environmental control system is provided in FIGS. 8 and 9. This SIR sensing system 800 comprises a two chamber reservoir system 870a, 870b juxtaposed around a sensor assembly 805. Below the reservoir system 870a, 870b and sensor assembly 805 is a PC board 844 and placed above is a getter system 834. The sensor assembly 805 comprises a surface mount LED 814 and photodiode(s) 822 which are optically coupled to sensors 818, 820. The sensors 818, 820 are held in place by a sensor stabilizing structure 821 that locks the sensors 818, 820 in a fixed position without interfering with the transmission and reception of light. Incorporated into the sensor stabilizing structure 821 are o-rings 999 and a reflector 803 that reflects light emitted from the LED 814 and through the sensor 818, 820 back toward the photodiodes 822.

The environmental control system comprises a reservoir system 870a, 870b positioned below a getter system 834, openings 832 to the external environment which permit gas to enter into sensor assembly 805 through the getter system 834, and a diffusion barrier 880 to regulate the movement of water vapor to and from the sensor assembly 805. The diffusion barrier 880 is held in place by a sealing means (not shown).

A variation of the third embodiment is provided in FIG. 9. A similar SIR system 900 is depicted except that the getter system 934a, 934b comprises two chambers juxtaposed around a sensor assembly 905. The reservoir 970 sits atop the sensor assembly 905 and getter system 934a, 934b. Openings 932 enable the flow of air from the outside, through the getter system 934, and into the sensor assembly 905. The saturated salt solution and a solid phase of that salt in the reservoir system 970 are isolated from the control chamber by a diffusion barrier, i.e. a membrane, 980 that controls the flow of water vapor.

The SIR sensor system can be miniaturized to form a Mini SIR (M-SIR) sensor system. M-SIRs use surface mount LEDs and photodiodes or Micro-Electro-Mechanical Systems (MEMS) made by photolithography. The MEMS Micro-SIR system can have the LED and photodiode components micro-machined onto a silicon chip which contains the microprocessor and other components. These MEMS system are very small and take very little power. The sensor can be miniaturized by growing the silicon dioxide substrate on the MEMS and coating the specific silicon dioxide substrate with the cyclodextrin based coating. As with the larger SIR systems, the micro and miniature SIR systems have a need for a housing that provides a controlled environment in a manner which is inexpensive, is orientation independent, and requires no power.

Referring to FIGS. 10–11, miniature "big top" design sensor systems are shown. The sensor system 1100 controls relative humidity within a range that is adequate to pass UL 2034 effective Oct. 1, 1998, through the use of a single sensing element 1118. Optionally, a plurality of sensors may be used.

The sensor system 1100 comprises an environment control system 1165 and sensor housing 1105. The sensor(s) 1118 are located within the central control chamber 1155 which is formed within the sensor housing 1105. The sensor(s) 1118 are separated by a few thousands of an inch by means of slots [not shown] molded into the sensor housing 1105. Optically coupled to the sensor(s) 1118, are a LED 1114 and photodiode 1122 which are also located within the sensor housing 1105. Photons emitted from the LED 1114 shine through the sensor(s) 1118 and strike the photodiode 1122 which records the extent of transmissivity and registers an alarm if necessary. The sensor housing 1105 may optionally have a plastic separator to further control the positioning of sensors 1118 in the sensor housing 1105.

The environment control system 1165 comprises chambers which contain the salt water reservoir system 1170 and the getter system 1134. An isolation membrane 1180 is located proximate to the salt water reservoir system 1170 and acts to separate the salt water reservoir system 1170 from the sensor housing 1105. The membrane 1180 is sealed in place by a thermal sealer not shown. The getter 1134 is placed at the air entry point [not shown] and used to restrict the inflow of undesirable contaminants into the sensor system 1100. As air enters though the openings [not shown], it is filtered by a first getter felt and, optionally, a second porous getter felt prior to being conditioned for relative humidity by the salt water reservoir system 1170.

FIGS. 10a, 10b, and 10c also depict a miniature SIR system. The SIR system 1000 comprises a base 1055 and a top 1065 having air entry ports 1032. Within the base 1055 is a LED 1014 and photodiode 1022 which are optically coupled to a plurality of sensors 1018. Wires [not shown] extend out of the base 1055 from the LED 1014 and photodiode 1022. The photons from the LED 1014 pass through the sensors 1018 and the strike the photodiode 1022.

A reservoir system 1070 is located in the base and separated from the rest of the sensor system 1000 by an isolation membrane 1080 which is located between the reservoir 1070 and a head space 1099. The top section 1065 holds in place the getter 1034 which is located proximate to the air entry port 1032. The top section 1065 is sealed to the base section 1055 by a snap fit that is ultrasonically welded. Proper seals and/or welds can help improve the life of the sensors 1018 and reduce the possibility of contaminates by passing the getter system 1034.

During operation, air containing CO enters the sensor system 1000 through an opening 1032, passes through the getter system 1034 and the head space 1099, and interacts with the sensors 1044 which photochemically react, thereby indicating the concentration of CO in the external air.

In sum, this system can be used to house CO sensor systems and to provide adequate warning for carbon monoxide levels in all humidity environments. As opposed to the methods commonly in use today such as pumping air through a desiccant, cooling, or humidifying, the present invention provides an atmosphere using no electrical or mechanical power.

More specifically, this novel SIR CO sensor is designed to function under the wide range of atmospheric conditions of high humidity 95% RH as well as 10% RH. The present invention allows a CO sensor as described in U.S. Pat. No. 5,063,164 to meet the proposed UL 2034 test standards and operate in a near 100% RH.

Furthermore, the present invention is not limited to CO sensor applications. For example, the CO sensor elements disclosed in the SIR systems may be replaced with other sensors of a similar type, e.g., ozone, nitrogen oxides, smog, acetone, $H_2S$, $NH_3$, aldehydes, ketones, volatile organic compounds, and other similar compounds. Biotechnology diagnostics to monitor medical or metabolic conditions or to monitor diabetics would also yield improved performance with relative humidity control.

Additionally, the present invention is not limited to housing sensors and does include other applications such as extending the operational effectiveness of various optical systems, magnetic systems, chemicals, electronics, biological systems, fuel cells, communication systems, weapons, lasers, machines, vehicles, motors and other systems requiring relative humidity control. All of these type of products and weapons system components will be preserved better or will operate more effectively in the controlled environments provided by the novel relative humidity air quality control system.

The present invention has been described in relation to limited examples which are for illustrative purposes and are not intended to limit the scope of the invention. Although specific embodiments, methods, and compositions have been described and illustrated herein, it will be apparent to those skilled in the art that further variations are possible. Thus, the present invention may be embodied and practiced otherwise than specifically described herein, and therefore the scope of the invention is defined by the following claims.

What is claimed is:

1. A device for controlling air quality characteristics within a defined air space of the device, the device comprising:
    a housing including one or more openings to an external environment:
    a reservoir incorporated within the housing; and
    a chamber disposed within the housing separate from the reservoir and providing a defined air space within the device, wherein the reservoir is in air-flow communication with the chamber;
    means disposed within the reservoir for controlling the relative humidity of air in the chamber; and
    an isolation means interposed between the means for controlling and the chamber that provides controlled relative rates of diffusion of water vapor into and out of the chamber, and that restricts the movement of liquid or solid matter between the means for controlling and the chamber.

2. The device of claim 1 wherein the means for controlling comprises a salt and water solution.

3. The device of claim 1 wherein the isolation means comprises a hydrophobic membrane.

4. The device of claim 1 wherein the housing further comprises a getter disposed within an air flow path through the housing upstream of the chamber, wherein said getter is capable of substantially absorbing a predetermined airborne contaminant.

5. A method for providing a controlled air quality environment within a device comprising the steps of:
    receiving air from an outside environment into a device housing, the housing including a reservoir disposed therein and a chamber separate from and in air-flow communication with the reservoir;
    controlling the relative humidity within the chamber by using a humidity control means comprising:
        a saturated salt solution disposed within the reservoir; and
        means for controlling relative rates of diffusion of water vapor into and out of the chamber, wherein the means provides a rate of water vapor diffusion from the chamber to the outside environment that is less than a rate of water vapor diffusion from the reservoir to the chamber when the relative humidity of the air in the outside environment is lower than the relative humidity of the air in the chamber, and wherein said control means provides a rate of water vapor diffusion from the chamber to the outside environment that is greater than a rate of water vapor diffusion from the reservoir to the chamber when the relative humidity of air in the outside environment is greater than the relative humidity of air in the chamber; and
    restricting the movement of solid and liquid matter from the humidity control means to the chamber.

6. The method of claim 5 wherein the step of restricting is achieved by enclosing the saturated salt solution in a hydrophobic membrane.

7. The method of claim 5 further comprising the step of substantially restricting predetermined airborne contaminants in the outside environment from reaching the chamber by positioning a getter within the air flow path of the device upstream from the chamber.

8. The method of claim 7 wherein the predetermined contaminants are selected from the group consisting of smoke, ozone, $NO_x$, volatile hydrocarbons, benzene, ammonia, hydrogen sulfide, mercury, oxygen, carbon dioxide, sulfur dioxide, hydrogen, combustible gases, methane, propane, butane, arsine, phosgene, carbon monoxide, and mixtures thereof.

9. A device for providing controlled air quality characteristics comprising:
    an internal chamber disposed within the device and in air-flow communication with an outside environment through one or more air openings in the device;
    a reservoir disposed within the device separated from the chamber, wherein the reservoir is positioned in air-flow communication with the chamber;

a salt and water solution disposed within the reservoir for controlling the relative humidity of air within the chamber;

a hydrophobic membrane interposed between the salt and water solution and the chamber that provides controlled relative rates of diffusion of water vapor into and out of the chamber, and that restricts the movement of liquid or solid matter between the salt and water solution and the chamber; and a getter disposed within the device and positioned within the device air flow path upstream of the chamber for removing unwanted airborne contaminants.

10. The device of claim 9 further comprising a membrane disposed within the device and within the device air flow path for directing predetermined airborne agents through the getter.

11. A sensing system comprising a regulated sensor environment comprising:

a housing having one or more air openings to an outside environment, and comprising:

a chamber disposed within the housing in air-flow communication with air routed into the housing from the outside environment;

a reservoir separated from the chamber that is in air-flow communication with air within the chamber;

means disposed in the reservoir for controlling the relative humidity of air within the chamber;

a gas permeable membrane interposed between the chamber and the means for controlling, the membrane providing controlled relative rates of diffusion of water vapor into and out of the chamber; and means disposed within the chamber for sensing the presence of a predetermined airborne contaminant by change in optical characteristics.

12. The system of claim 11 wherein the means for sensing comprises one or more sensors that are optically coupled to a photon emitting source and a photon detecting device.

13. The system of claim 11 wherein the sensing means is capable of sensing contaminants selected from the group consisting of smoke, ozone, $NO_x$, volatile hydrocarbons, benzene, ammonia, hydrogen sulfide, mercury, oxygen, carbon monoxide, sulfur dioxide, hydrogen, combustible gases, methane, propane, butane, arsine, phosgene, and mixtures thereof.

14. A device for controlling the relative humidity within an air space defined within the device, the device comprising:

a housing having an outside wall surface and one or more air passages disposed therethrough for receiving air from an environment outside of the housing;

a reservoir disposed within the housing;

a chamber disposed within the housing separate from the reservoir and defining an air space within the housing, the chamber being in air-flow communication with the reservoir and air received from the one or more air passages;

a saturated salt solution and solid salt disposed within the reservoir for controlling the relative humidity of air within the chamber;

a gas permeable membrane disposed within the housing and interposed between the saturated salt solution and solid salt and the chamber, the membrane providing controlled relative rates of water vapor diffusion into and out of the chamber; and means disposed within the housing within an air flow path upstream of the chamber for preventing the passage of predetermined airborne contaminants to the chamber.

15. A sensor system comprising a pair of optically responsive sensors, a light emitting source, and a light receiving source, wherein the sensors are disposed within the chamber of the device recited in claim 14.

16. A sensor system having a relative humidity controlled sensor environment comprising:

a housing having an outside wall surface and one or more air passages disposed therethrough for receiving air into the housing from an outside environment;

a reservoir disposed within the housing;

a chamber disposed within the housing separate from the reservoir and defining an air space within the housing, the chamber being in air-flow communication with the reservoir and with air received into the housing from the one or more passages;

a saturated salt solution disposed within the reservoir for controlling the relative humidity of air in the chamber;

a gas permeable membrane disposed within the housing and interposed between the saturated salt solution and the chamber, the membrane providing controlled rates of diffusion of water vapor into and out of the chamber;

one or more optically responsive sensors disposed within the chamber;

a photon emitting source disposed within the housing and positioned to emit photons onto the one or more sensors; and a photon detecting device disposed within the housing and positioned to collect photons emitted onto the one or more sensors.

17. The system as recited in claim 14 further comprising means disposed within the housing for preventing the passage of predetermined airborne contaminants to the chamber.

18. The device as recited in claim 1 further comprising an optically responsive sensor disposed within the chamber.

19. The device as recited in claim 9 further comprising an optically response sensor system disposed within the chamber for detecting the presence of a predetermined target gas.

20. The system as recited in claim 11 further comprising means for removing an airborne contaminate from air routed into the housing from the outside environment, wherein the means for removing is positioned within the housing in an air flow path upstream of the chamber.

21. A humidity controlled sensor system for detecting the presence of a target gas comprising:

a housing comprising a humidity controlled air space therein, the housing including one or more air passages for placing the air space in communication with air within an outside environment;

a reservoir disposed within the housing separate from and in air-flow communication with the air space, the reservoir comprising a saturated salt solution for providing a controlled relative humidity environment in the air space;

a permeable membrane interposed between the saturated salt solution and the air space for providing controlled rates of diffusion of water vapor into and out of the air space, and to prevent migration of liquid and solid material into the air space;

a getter disposed within the housing and positioned within an air stream running from the one or more air passages to the air space, wherein the getter is adapted to remove one or more predetermined airborne contaminate from air within the housing before reaching the air space;

one or more optically responsive sensors disposed within the housing and in air-flow communication with air in the air space;

a light emitting diode disposed within the housing adjacent the one or more sensors for emitting photons onto the one or more sensors; and a photodetector disposed within the housing adjacent the one or more sensors for receiving photons from the one or more sensors.

* * * * *